(12) United States Patent
Ashok Kumar et al.

(10) Patent No.: US 11,531,581 B2
(45) Date of Patent: Dec. 20, 2022

(54) EVENT ROOT CAUSE IDENTIFICATION FOR COMPUTING ENVIRONMENTS

(71) Applicant: Citrix Systems, Inc., Fort Lauderdale, FL (US)

(72) Inventors: Arjun Ashok Kumar, Coimbatore (IN); Maanusri Balasubramanian, Chennai (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/069,215

(22) Filed: Oct. 13, 2020

(65) Prior Publication Data

US 2022/0114040 A1 Apr. 14, 2022

(51) Int. Cl.
*G06F 11/07* (2006.01)

(52) U.S. Cl.
CPC ........ *G06F 11/079* (2013.01); *G06F 11/0709* (2013.01); *G06F 11/0793* (2013.01)

(58) Field of Classification Search
CPC . G06F 11/0709; G06F 11/079; G06F 11/0793
See application file for complete search history.

(56) References Cited

U.S. PATENT DOCUMENTS

| | | | | |
|---|---|---|---|---|
| 7,113,988 B2* | 9/2006 | Chirashnya | ........... | H04L 41/142 709/224 |
| 8,069,370 B1* | 11/2011 | Li | ........................ | G06F 11/079 714/26 |
| 8,140,898 B2* | 3/2012 | Beg | ..................... | H04L 41/0631 714/25 |
| 8,171,343 B2* | 5/2012 | Beg | ......................... | H04L 41/12 714/37 |
| 8,417,656 B2* | 4/2013 | Beg | .................... | G05B 23/0243 706/45 |
| 8,612,377 B2* | 12/2013 | Beg | ..................... | G06F 11/0748 714/26 |
| 9,497,072 B2* | 11/2016 | Gates | .................. | H04L 41/0631 |
| 10,261,839 B2* | 4/2019 | Delaney | .............. | G06F 11/3447 |
| 2005/0049988 A1* | 3/2005 | Dahlquist | .......... | G05B 23/0278 706/46 |
| 2011/0154117 A1* | 6/2011 | Danielson | ............. | G06F 11/321 715/764 |

(Continued)

OTHER PUBLICATIONS

Velasco, FJ; "A Bayesian Network approach to diagnosing the root cause of failure from trouble tickets;" Artificial Intelligence Research, Dec. 2012, vol. 1, No. 2; pp. 75-85.*

*Primary Examiner* — Joseph R Kudirka
(74) *Attorney, Agent, or Firm* — Banner & Witcoff, Ltd.

(57) ABSTRACT

Systems and apparatuses for identifying root causes of events within an computing environment described herein. A causality network may be generated based on detected events in the computing environment. The causality network may be nodes for the events and directed edges showing the casual relations between the nodes. Conditional probability tables (CPTs) for the nodes may show the strength of the causal relations. When an event occurs, computing device may identify the node for the event in the causal network and traverse the causal network until a root cause node is identified. The computing device may output the root cause node and the path of traversal.

20 Claims, 16 Drawing Sheets

(56) References Cited

U.S. PATENT DOCUMENTS

2012/0215450 A1* 8/2012 Ashok ................ G05B 23/0262
702/9
2015/0074035 A1* 3/2015 Narasappa ............. G06N 7/005
706/52
2017/0364819 A1* 12/2017 Yang ................... H04L 41/0636

* cited by examiner

|   | A | B | C | D | E |
|---|---|---|---|---|---|
| A |   | x |   | x |   |
| B |   |   | x |   |   |
| C |   |   |   |   | x |
| D |   |   | x |   |   |
| E |   |   |   |   |   |

FIG. 9

|  | P(a = TRUE) | P(a = FALSE) |
|---|---|---|
| P(b = TRUE) | $X_1$ | $X_2$ |
| P(b = FALSE) | $X_3$ | $X_4$ |

EVENT ROOT CAUSE IDENTIFICATION FOR COMPUTING ENVIRONMENTS

FIELD

Aspects described herein generally relate to computer network operations, and more particularly to identification of root causes of events occurring in computing environments.

BACKGROUND

Computer networks provide various services, such as cloud computing, other cloud based services, e-commerce, back-end support for different types of communications, etc. Computer networks covering a large geographic area, e.g., wide area network operations such as Internet operations, are incredibly complex and prone to different types of error conditions. For example, various errors may occur at different points within the computer networks.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Existing methods of detecting errors are time-consuming, inefficient, and often inaccurate. For instance, if a critical event occurs in a computing environment, the event may have to be manually observed and analyzed to identify its root cause. This manual process is time consuming and may take one or more network services offline for a considerable amount of time. Human beings are naturally slow in data analysis and generally cannot reach the speed of computer-based data analysis. The manual process is also inefficient, as it may require multiple personnel, reviewing or otherwise, sifting through large amounts of information (e.g., data dumps at different locations) to determine the root cause, which takes time and increases costs to operate the computing environment. The manual process is also inaccurate because it relies heavily on subjective judgement and experience of the personnel performing the process. For instance, an engineer may not consider all possible events that may be causing a critical event. Generally, the engineers may not have adequate experience and training to understand all the nuances and subtleties of the process and may misdiagnose a problem.

To overcome limitations described above, and to overcome other limitations that will be apparent upon reading and understanding the present specification, aspects described herein are directed towards generating and deploying a causality network (e.g., a Bayesian belief network) for efficient and automated identification of root causes of events in the computing environment.

In an example, a method comprises receiving, by a computing device, data indicative of an event of a computing environment; identifying a data point within a collection of data, the data point being representative of the event; determining a root cause of the event by beginning an analysis of the collection of data from the identified data point and ending at a data point of the collection from which no other causal relations to other data points of the collection exist, the analysis including determination to proceed to a next data point of the collection based on a probability that a given data point represents another event causing the event and existence of a direct causal relation between a data point under analysis and the next data point; and generating output that identifies the root cause of the event based on the analysis of the collection of data.

In another example, a method comprises receiving, by a computing device, data indicative of an event of a computing environment; identifying a data point within a collection of data, the data point being representative of the received event; determining a root cause of the event by traversing the collection of data from the identified data point and based on conditional probabilities of child data point and parent data point pairs in the path of traversal, until a data point with no parent is reached; and outputting an event represented by the data point with no parent as the root cause of the event.

In yet another example, a method comprises receiving a plurality of data instances from a computing environment; identifying a plurality of events from the data instances; associating a first event of the plurality of events with a second event of the plurality of events to indicate a causal relation between the first event and the second event; in response to determining that the causal relation is a new relation: generating at least one of a first data point representing the first event and a second data point representing the second event; generating an edge from the first data point to the second data point; appending the edge and at least one of the first data point and the second data point to a collection of data; and calculating conditional probability tables for at least one of the first data point and the second data point.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 9 depicts an illustrative adjacency matrix.

FIG. 12 depicts an illustrative conditional probability table (CPT).

DETAILED DESCRIPTION

Figure 1:
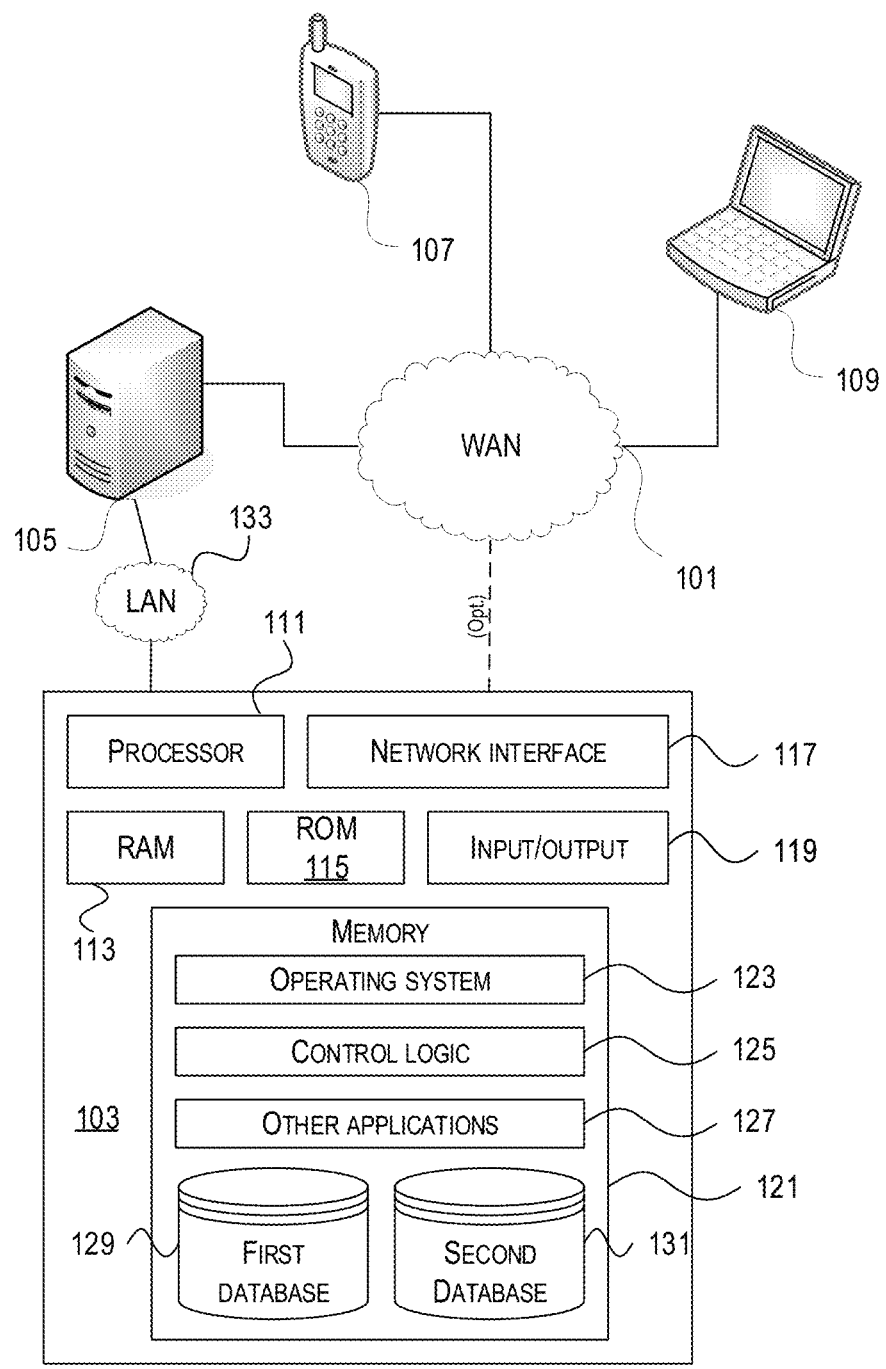
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

Various events (e.g., critical events) may occur within a computing environment (e.g., cloud service). An event may be an occurrence or an activity within the computing environment. For instance, a communication from one component to another component in the computing environment may be an event. Critical events may be significant occurrences or activities within the computing environment. For instance, critical events may be more likely to cause disruption in the operation of the computing environment. These critical events may be error conditions, e.g., "activities in pipelines timing out," "process X taking too long to complete," "low refresh interval," etc. A critical event may be a manifestation of other events (e.g., root cause events) and may indicate other points of failure or malfunction of the computing environment. For instance, the "activities in pipelines timing out" may be caused by "low refresh interval." The "low refresh interval," in which activities in the pipelines may have to be refreshed at shorter intervals may not allow a sufficient timeout for these activities, and cause them to time out prematurely. The same root cause may introduce other critical events or errors into the computing environment. A timely identification of one or more root causes may aid anticipation and proactive actions taken to address critical events such that the operations of the environment continue to run smoothly.

As a general introduction to the subject matter described in more detail below, aspects described herein are directed towards computing devices that analyze causal relations of events that occur during operation of a computing environment. For instance, the analysis may involve use of a collection of data such as a causality graph, tree, or network to pictorially illustrate the causal relations of events that occur across devices of the computing environment. The collection of data (e.g., causality network) may include data points (e.g., nodes) that represent events of the computing environment and edges between the data points that represent causal relations amongst the various data points of the collection of data. Strength of the causal relations between the data points of the data collection (e.g., between nodes of the causality network) can also be included in the analysis, for example, with use of conditional probability tables (CPTs). In one example, a computing device may receive an event from an event queue of the computing environment. The computing device may identify a node that represents the received event in the causality network. The computing device may begin its causality analysis of the event from that node. The analysis may involve identification of adjacent nodes in the causality network in which there is a causal relation with the identified node. Based on the strength of the causal relation between the identified node and its parent nodes, another node is selected and the analysis is repeated for the selected node. The analysis may continue until a node is identified that has no causal relations to other parent nodes. That node is known as a root cause node. Having identified the root cause node, the computing device may output the root cause node and the causation path from the identified node to the root cause node so as to determine the root cause for the received event.

Other aspects are directed towards preprocessing and structuring data instances generated in the computing environment and training/retraining the causality network using the structured data. A computing device may receive various data instances (e.g., Jira tickets, Confluence troubleshooting pages) and use natural language processing to identify events in the various data instances. The computing device may associate the events with various data instances. For example, a first data instance (e.g., Jira ticket) may include events A, B, and C. The computing device may also generate an adjacency matrix showing the causal relations between the events. For example, event A may cause event B but not event C. A computing device may then use these causal relations to generate or update (e.g., train) the causality network. A trained causality network may indicate the causal relations between nodes for the various events and indicate the strength of the causal relations using CPTs for the nodes. The causality network may be updated and retrained based on new data instances and/or accuracy of its identifications.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and their equivalents. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes only and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network,"

which is comprised of the data—attributable to a single entity—which resides across all physical networks. It also should be understood that the "causality network" described below refers to a machine learning model such as a Bayesian belief network.

The components may include data server 103, web server 105, and client computers 107, 109. Data server 103 provides overall access, control and administration of databases and control software for performing one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client computer 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

The components 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
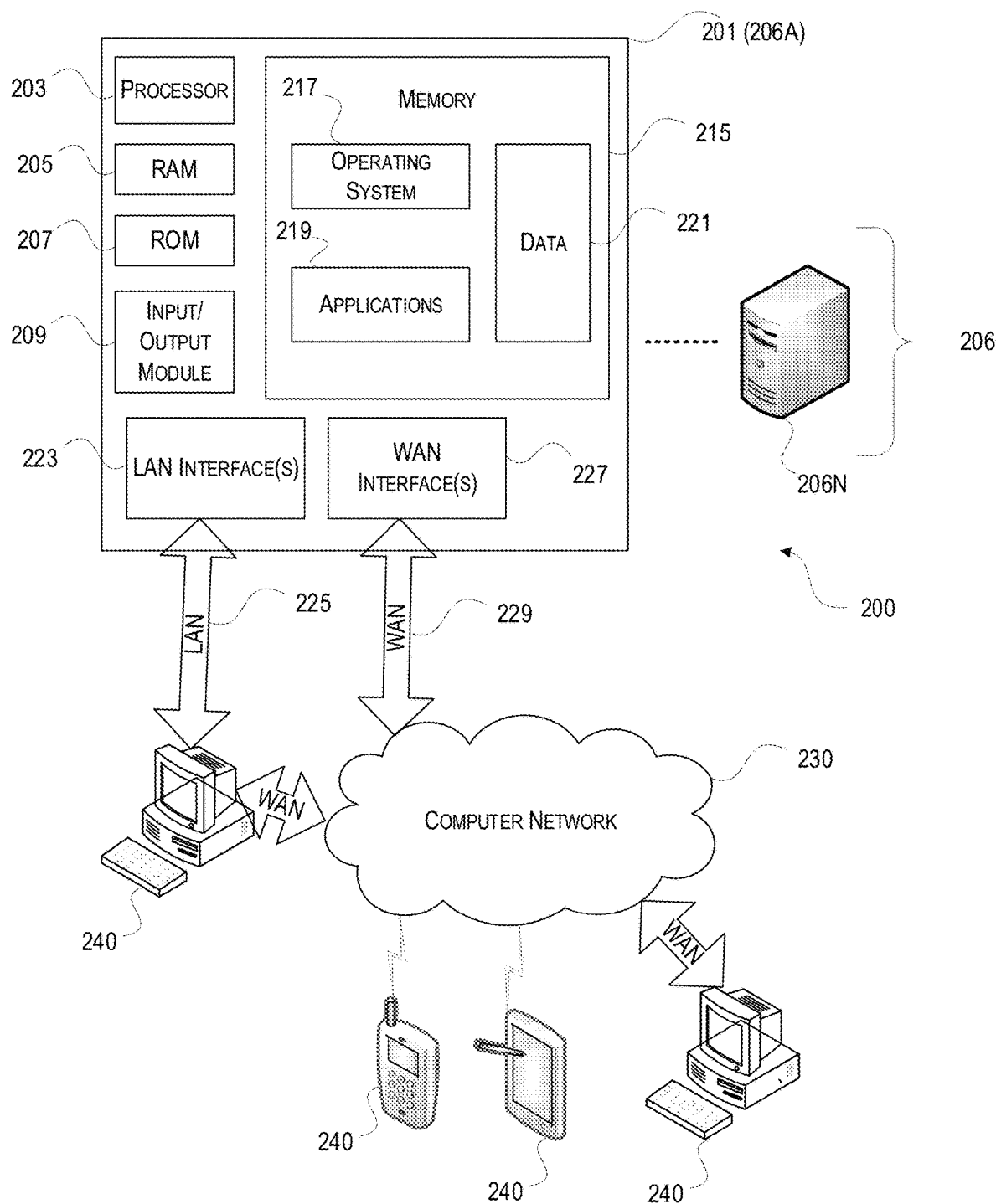
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206*a* in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client device 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
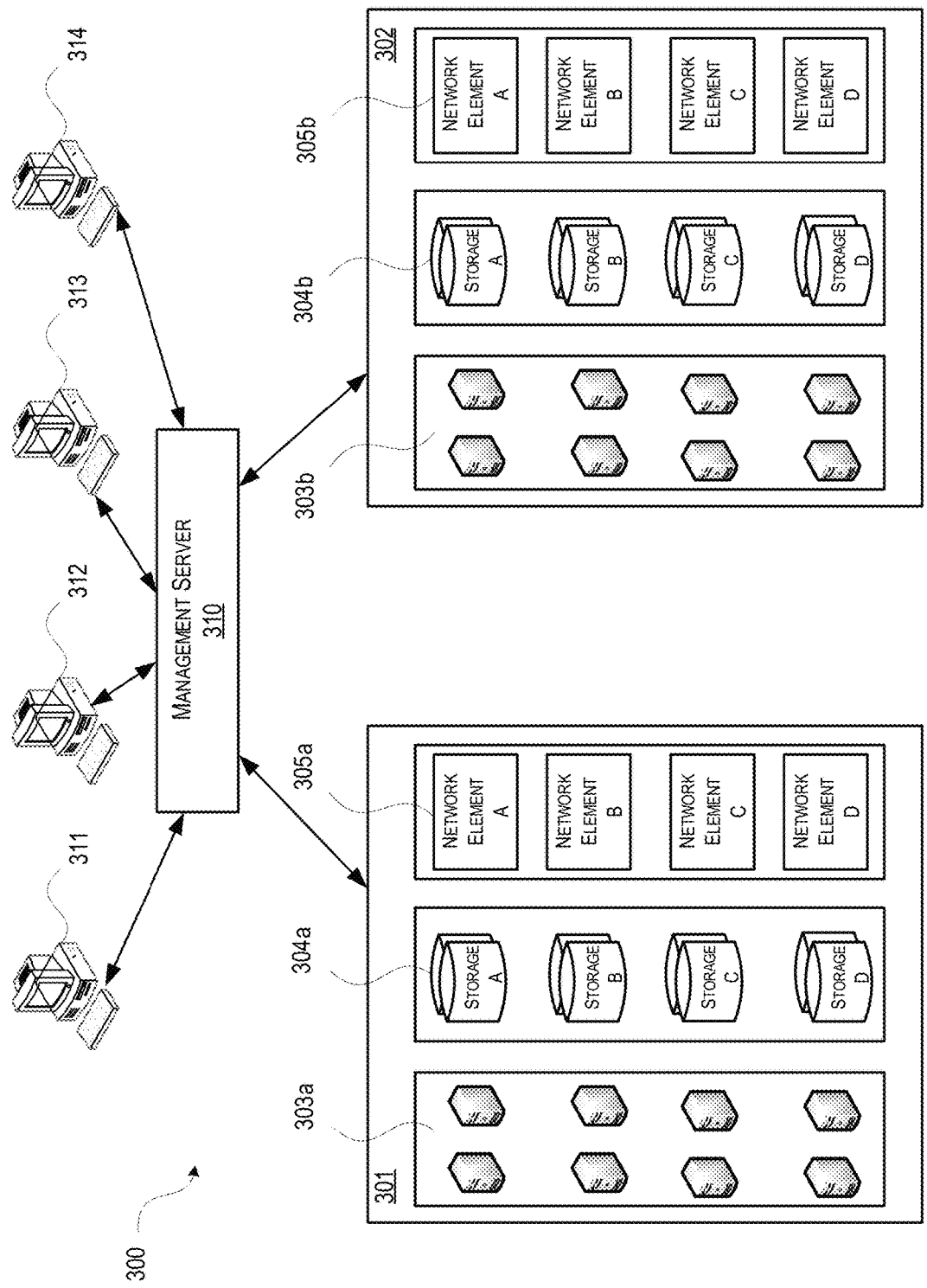
FIG. 3 depicts an illustrative cloud-based system architecture that may be used in accordance with one or more illustrative aspects described herein.

With further reference to FIG. 3, some aspects described herein may be implemented in a cloud-based environment. FIG. 3 illustrates an example of a cloud computing environment (or cloud system) 300. As seen in FIG. 3, client computers 311-314 may communicate with a cloud management server 310 to access the computing resources (e.g., host servers 303a-303b (generally referred herein as "host servers 303"), storage resources 304a-304b (generally referred herein as "storage resources 304"), and network elements 305a-305b (generally referred herein as "network resources 305")) of the cloud system.

Management server 310 may be implemented on one or more physical servers. The management server 310 may run, for example, Citrix Cloud by Citrix Systems, Inc. of Ft. Lauderdale, Fla., or OPENSTACK, among others. Management server 310 may manage various computing resources, including cloud hardware and software resources, for example, host computers 303, data storage devices 304, and networking devices 305. The cloud hardware and software resources may include private and/or public components. For example, a cloud may be configured as a private cloud to be used by one or more particular customers or client computers 311-314 and/or over a private network. In other embodiments, public clouds or hybrid public-private clouds may be used by other customers over an open or hybrid networks.

Management server 310 may be configured to provide user interfaces through which cloud operators and cloud customers may interact with the cloud system 300. For example, the management server 310 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 310 also may include a set of APIs and/or one or more customer console applications with user interfaces configured to receive cloud computing requests from end users via client computers 311-314, for example, requests to create, modify, or destroy virtual machines within the cloud. Client computers 311-314 may connect to management server 310 via the Internet or some other communication network, and may request access to one or more of the computing resources managed by management server 310. In response to client requests, the management server 310 may include a resource manager configured to select and provision physical resources in the hardware layer of the cloud system based on the client requests. For example, the management server 310 and additional components of the cloud system may be configured to provision, create, and manage virtual machines and their operating environments (e.g., hypervisors, storage resources, services offered by the network elements, etc.) for customers at client computers 311-314, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 311-314 may be related, for example, to different client computers creating virtual machines on behalf of the same end user, or different users affiliated with the same company or organization. In other examples, certain clients 311-314 may be unrelated, such as users affiliated with different companies or organizations. For unrelated clients, information on the virtual machines or storage of any one user may be hidden from other users.

Referring now to the physical hardware layer of a cloud computing environment, availability zones 301-302 (or zones) may refer to a collocated set of physical computing resources. Zones may be geographically separated from other zones in the overall cloud of computing resources. For example, zone 301 may be a first cloud datacenter located in California, and zone 302 may be a second cloud datacenter located in Florida. Management server 310 may be located at one of the availability zones, or at a separate location. A zone may include an internal network that interfaces with devices that are outside of the zone, such as the management server 310, through a gateway. End users of the cloud (e.g., clients 311-314) might or might not be aware of the distinctions between zones. For example, an end user may request the creation of a virtual machine having a specified amount of memory, processing power, and network capabilities. The management server 310 may respond to the user's request and may allocate the resources to create the virtual machine without the user knowing whether the virtual machine was created using resources from zone 301 or zone 302. In other examples, the cloud system may allow end users to request that virtual machines (or other cloud resources) are allocated in a specific zone or on specific resources 303-305 within a zone.

In this example, the zones 301-302 may include an arrangement of various physical hardware components (or computing resources) 303-305, for example, physical hosting resources (or processing resources), physical network resources, physical storage resources, switches, and additional hardware resources that may be used to provide cloud computing services to customers. The physical network resources in a cloud zone 301 or 302 may include one or more network elements 305 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 301-302 may include storage disks (e.g., solid state drives (SSDs), magnetic hard disks, etc.) and other storage devices.

The example cloud computing environment shown in FIG. 3 also may include a virtualization layer with additional hardware and/or software resources configured to create and manage virtual machines and provide other services to customers using the physical resources in the cloud. The virtualization layer may include hypervisors along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in the virtualization servers 303 with the physical computing resources. Known cloud systems may alternatively be used, e.g., MICROSOFT AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Event Root Cause Identification for Computing Environments

Figure 4:
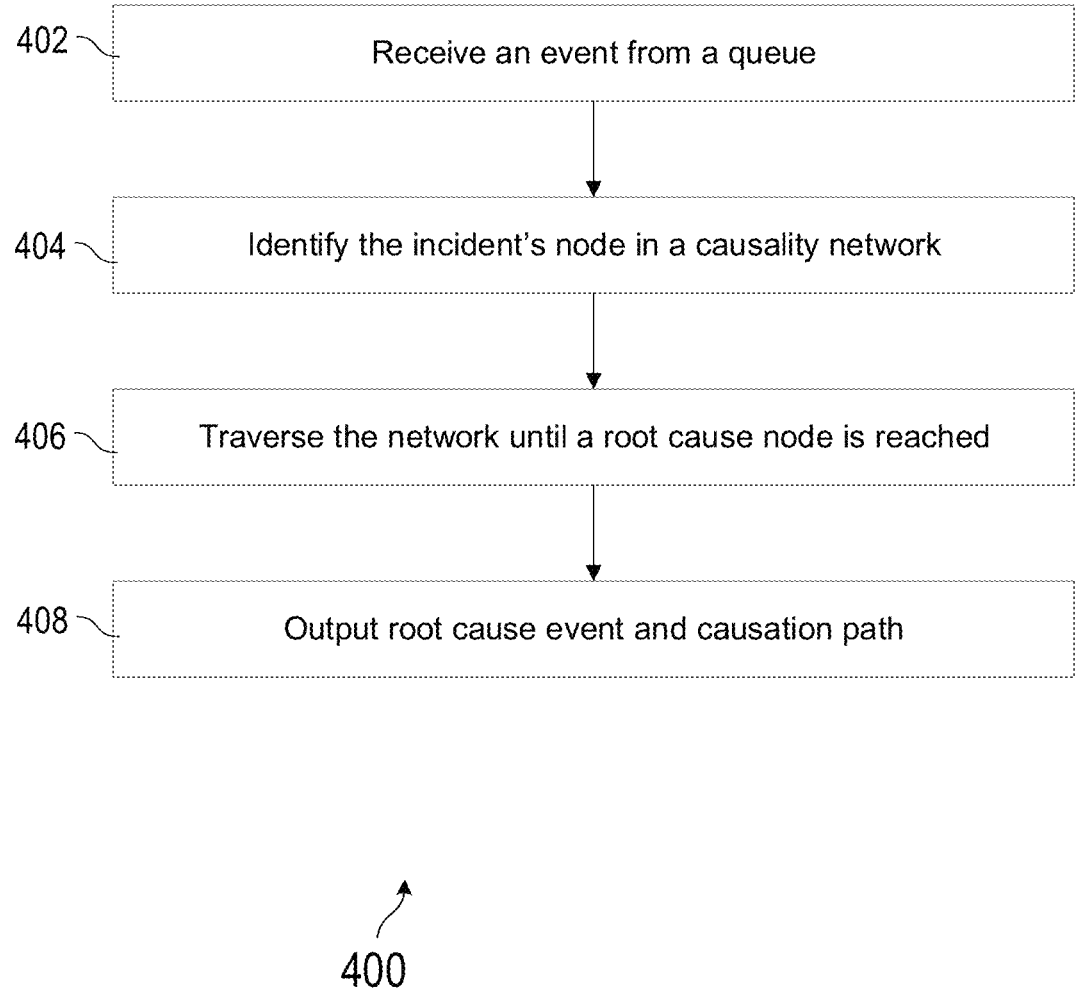
FIG. 4 depicts a flow chart of an illustrative method of root cause identification.

FIG. 4 depicts a flow chart of an illustrative method 400 of root cause identification in a computing environment. The steps of the method 400 may be performed by any type of computing device, (e.g., computing devices 103, 105, 107, 109 in FIG. 1; computing device 201 in FIG. 2; and/or computing devices 301, 302, 310 in FIG. 3) or a combination of computing devices. It should further be understood that the steps of the method 400 are merely illustrative and additional, alternative, and fewer number of steps should also be considered within the scope of this disclosure.

Figure 6:
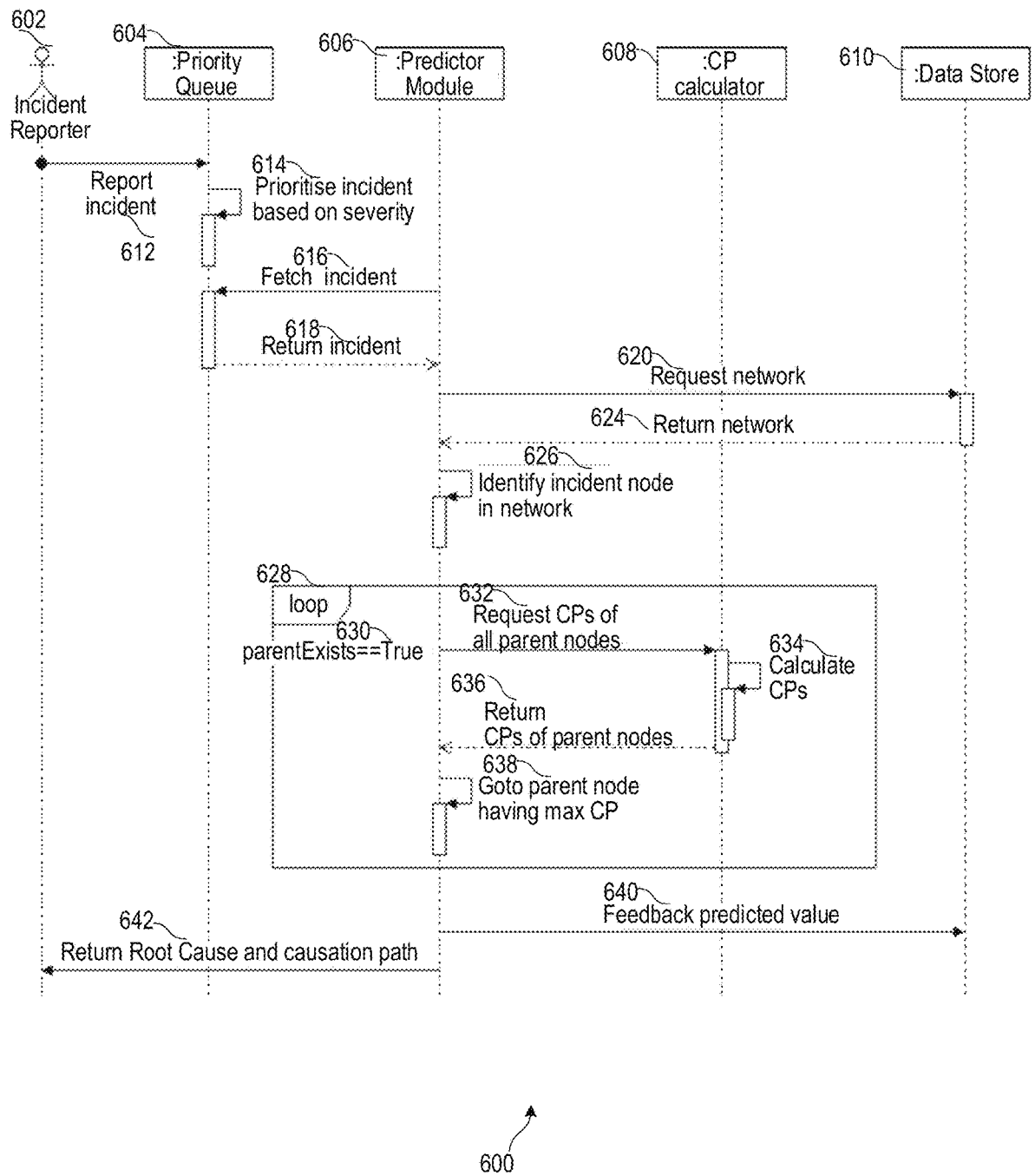
FIG. 6 depicts a sequence diagram of an illustrative method of root cause identification.

The method 400 may begin at step 402, where the computing device may fetch an event from a queue (e.g., priority queue 604 in FIG. 6). The event may occur within a computing environment, such as a cloud computing platform. A client or endpoint computing device (e.g., executing an incident reporter bot) may input the event in the queue, which may contain a series of reported events. In examples having a priority queue, the priorities of events within the priority queue are assigned based on the severity of the event. The computing device may fetch the event (e.g., the highest priority event) from the priority queue for further processing.

At a next step 404, the computing device may identify the node that represents the received event in a causality network. The causality network may comprise a tree and/or graph structure with various nodes representing various events and with edges indicating causal relations between the nodes. The computing device may identify the node based on any text based comparison. For instance, data within the node may comprise the name and/or description of the event represented by the node (e.g., a text string "activities in pipeline are timing out"). The computing device may perform a text based comparison of the received event (e.g., a string with a title and/or description of the received event) and select the node with the text that closely matches the text of the received event. The text based comparison may therefore allow the computing device to identify the node that represents the received event within the various nodes of the causality network.

At a next step 406, the computing device may evaluate or otherwise analyze subsequent nodes of causality network until a root cause node is reached. The analysis or evaluation may be based on the conditional probability table (CPTs) of the identified node and the intermediate nodes until the root cause node is reached. As detailed with regard to FIG. 5 below, the computing device may use the CPTs to select a parent node for a child node from multiple candidate parent nodes. In other words, the CPTs may indicate the strength of the causal relations between the parent-child node pairs in the causality network, and the computing device may traverse the causality network based on the strength of the relations (e.g., by taking the path of the strongest causal relations).

At a next step 406, the computing device may output the root cause event and the causation path as a result of the above described analysis. In other words, the root cause event and the causation path may be the output of the root cause identification process being executed by the computing device. The root cause event may therefore be identified based on the received event and the causation path may show the likelihood of the other events in the causation path. The root cause and/or the causation path may be used to mitigate the associated problems. For instance, the computing device may execute a process to mitigate the root cause event and/or to mitigate one or more events in the causation path.

FIGS. 5A-5D depict an illustrative traversal through a causality network 500. The traversal may be performed by any type of computing device, (e.g., computing devices 103, 105, 107, 109 in FIG. 1; computing device 201 in FIG. 2; and/or computing devices 301, 302, 310 in FIG. 3) or a combination of computing devices.

Figure 5A:
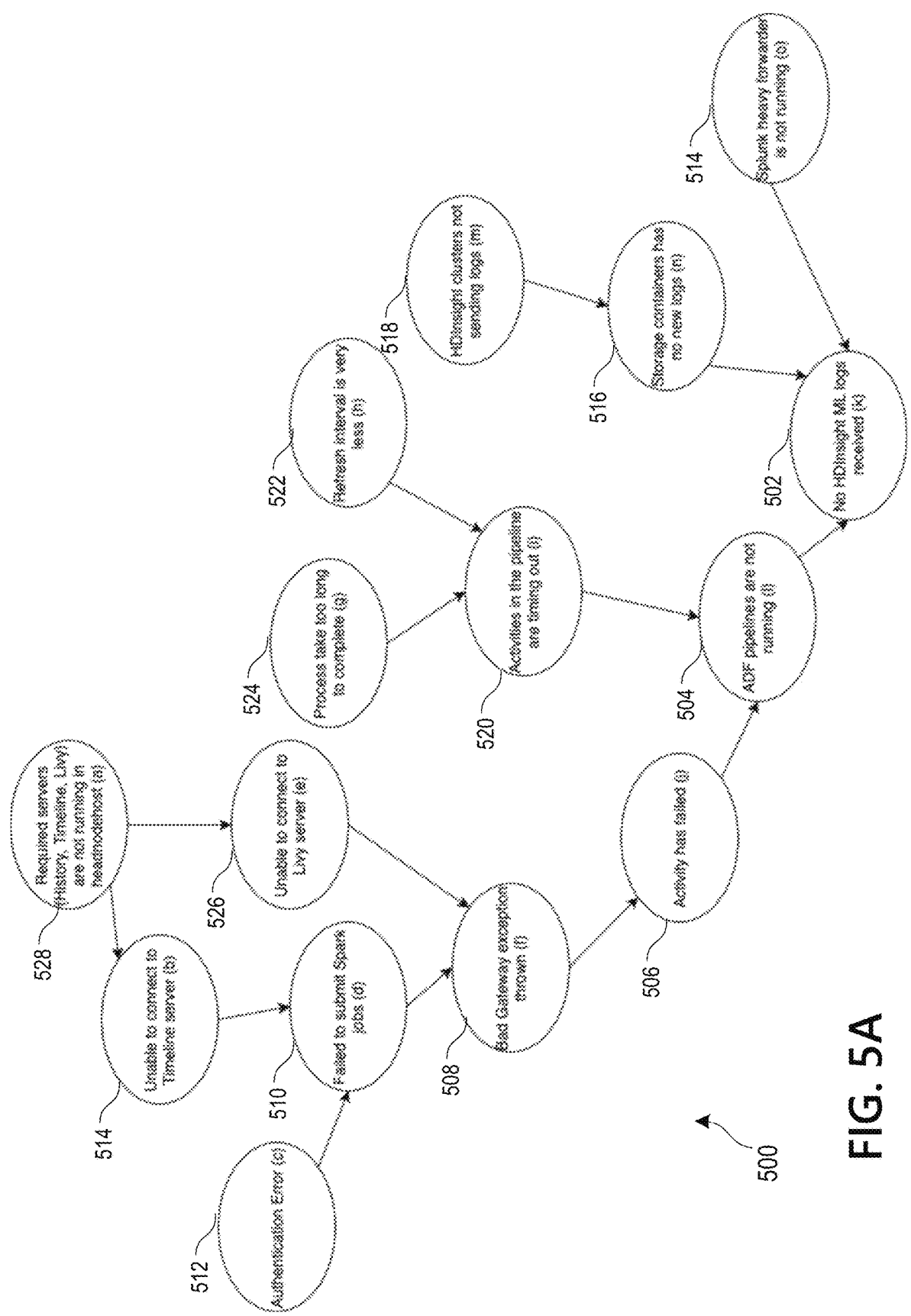
FIGS. 5A-5D depict an illustrative traversal through a causality network for root cause identification.

FIG. 5A shows the causality network 500 with nodes 502-528 with causal relations. The nodes 502-528 may represent events in the computing environment. The directed arrows may depict the causal relations between the nodes 502-528 and therefore may depict causal relations between the events represented by the nodes 502-528. For example, an event of node 504 may cause an event of node 502. The nodes also have conditional probability tables (CPTs) (an example CPT 1200 is shown in FIG. 12). The CPTs may be stored within the node itself or otherwise associated with the node. The computing device may use the CPTs to traverse through the causality network 500.

Figure 5B:
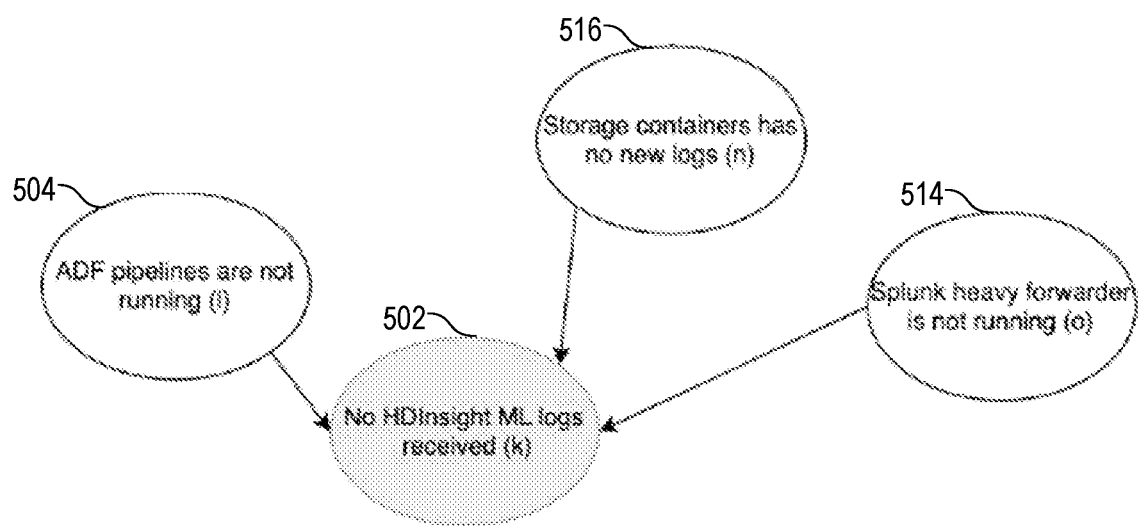

The computing device may receive (or fetch) an event for which a root cause may have to be identified traversing through the causality network 500. The received event may be "No HDInsight ML logs received (k)." The computing device may identify node 502 for the event. The identification may be based upon comparing the description of the event and the description of the node 502. FIG. 5B shows a portion of the causality network with the identified node 502 and its parent nodes 504 (event "ADF pipelines are not running (l)"), 516 (event "Storage containers have no new logs(n)"), and 514 (event "Splunk heavy forwarder is not running (o)"). A parent node for a given node may represent an event that may have caused the event of the given node. In other words, the computing device may traverse the causality network 500 from children nodes (e.g., representing events that have been caused) towards parent nodes (e.g., representing events that may have caused the events represented by the children nodes).

The computing device using the CPT tables for node 502 may calculate conditional probabilities for the parent nodes 504, 516, and 514 based on the evidence that event "k" (of node 502) has occurred. For instance, the computing device may execute one or more calculation modules to calculate the conditional probabilities. The conditional probabilities that the computing device calculates are $P(l|k=TRUE)$ (conditional probability of occurrence of event of node 504 given that the event of node 502 has occurred); $P(n|k=TRUE)$ (conditional probability of occurrence of event of node 516 given that the event of node 502 has occurred); and $P(o|k=TRUE)$ (conditional probability of occurrence of event of node 514 given that the event of node 502 has occurred). The computing device may select for further traversal the node with the highest conditional probability. Here, the computing device may select node 504 (event "l"), which may have the highest conditional probability.

Figure 5C:
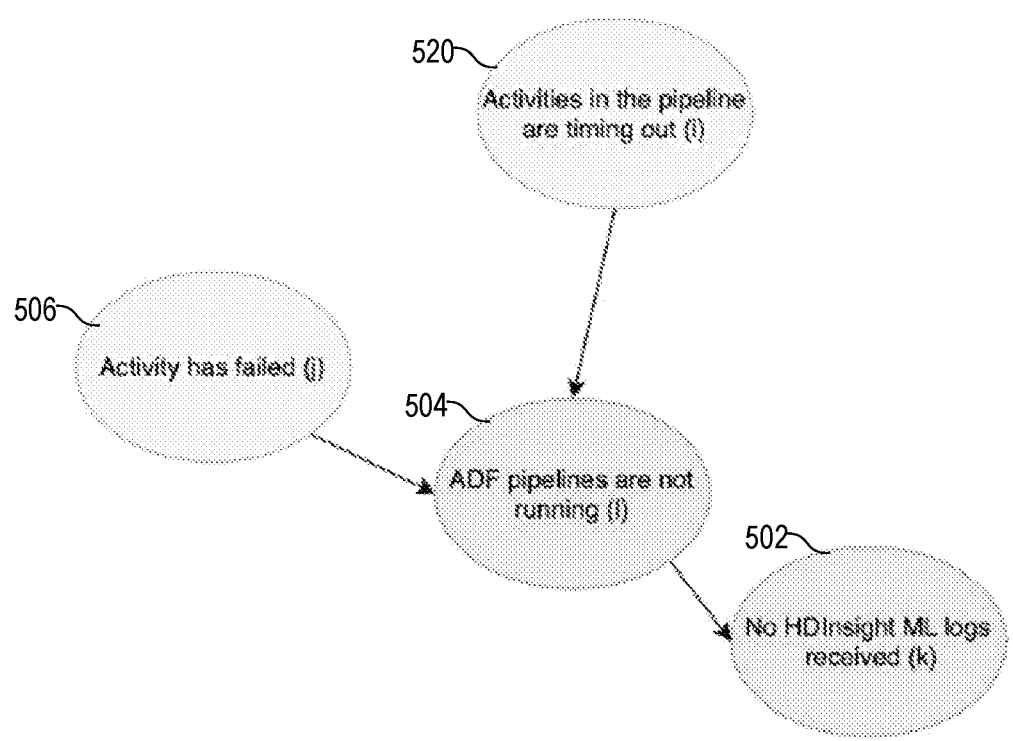

For further traversal through the causality network 500, the computing device may identify the parent nodes for node 504 and calculate conditional probabilities for the parent nodes. FIG. 5C shows a portion of the causality network 500 illustrating the parent nodes for node 504, the parent nodes being node 506 (event "Activity has failed (j)") and node 520 (event "Activities in the pipeline are timing out (i)"). The computing device may calculate the conditional probabilities for the parent nodes 506 and 520 given that the events of nodes 502 and 504 have occurred. These conditional probabilities may be: P(j|k=TRUE, l=TRUE) (conditional probability of occurrence of event of node 506 given that events of nodes 504 and 502 have occurred) and P (i|k=TRUE, l=TRUE) (conditional probability of occurrence of event of node 520 given that events of nodes 504 and 502 have occurred). Here, the computing device may select node 520 (event "i"), which may have the highest conditional probability (P (i|k=TRUE, l=TRUE)>P (j|k=TRUE, l=TRUE)).

Figure 5D:
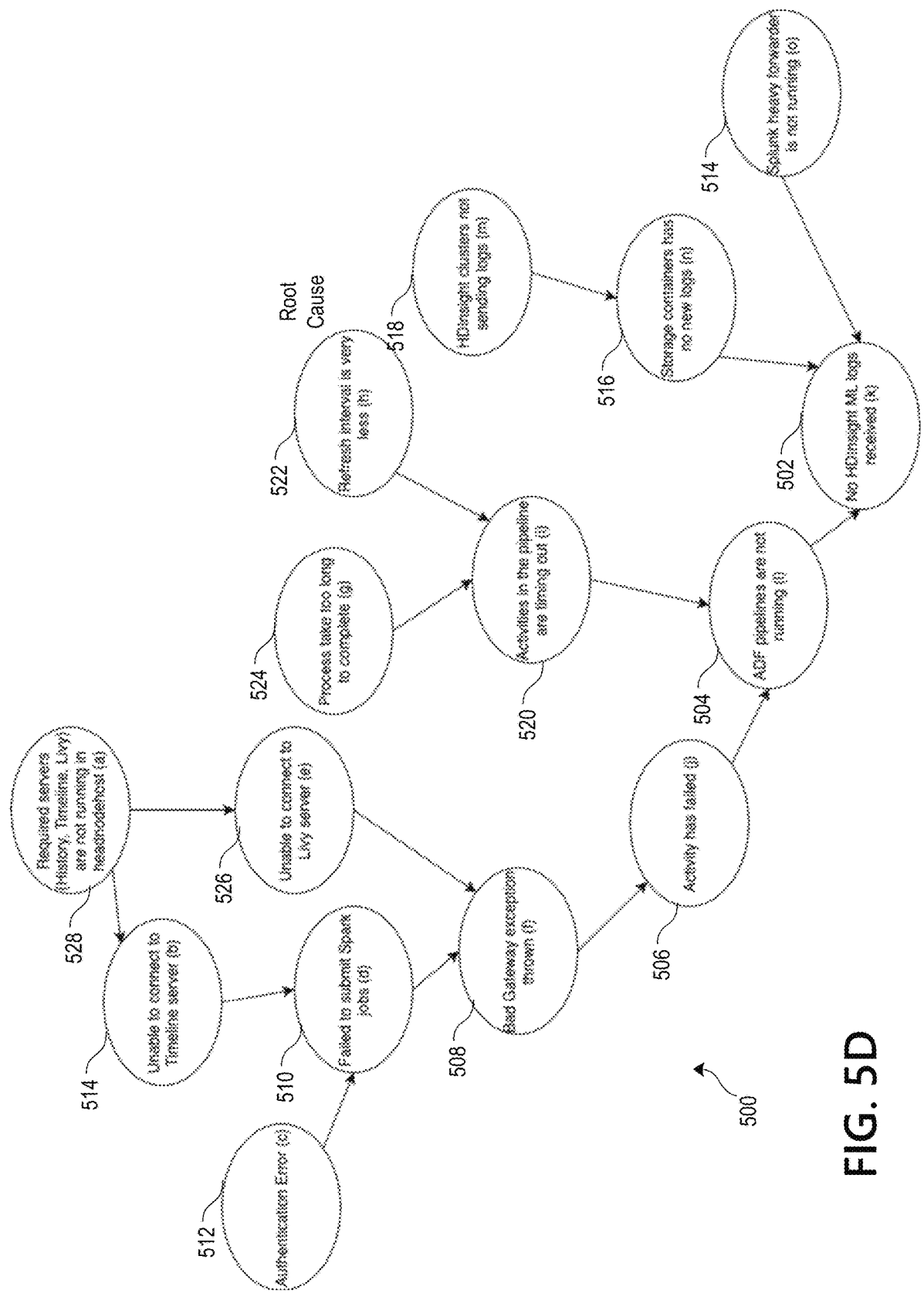

For further traversal through the causality network 500, the computing device may identify the parent nodes for node 520 and calculate the conditional probabilities for the parent nodes. FIG. 5D shows the causality network 500 showing the parent nodes 524 (event "Process takes too long to complete(g)") and 522 (event "Refresh interval is very less (h)"). The computing device may calculate conditional probabilities of the parent nodes as follows: P (g|i=TRUE, l=TRUE, k=TRUE) (conditional probability of occurrence of event of node 524 given that events of nodes 520, 504, and 502 have occurred) and P (h|i=TRUE, l=TRUE, k=TRUE) (conditional probability of occurrence of event of node 522 given that the events of nodes 520, 504, 502 have occurred). Here, the computing device may select node 522 (event "h"), which may have the highest conditional probability (P (h|i=TRUE, l=TRUE, k=TRUE)>P (g|i=TRUE, l=TRUE, k=TRUE)).

The computing device may determine that the node 522 does not have a parent node and therefore indicate node 522 to be the root cause node. In other words, the computing device may determine the event "h" of node 522 is the root cause of the event "k" of node 502. The computing device may output the root cause (event "h") and the path of traversal event "k" (node 502)→event "l" (node 504)→event "i" (node 520)→event "h" (node 522). The root cause and the path of traversal may then be used to solve any error condition in the computing environment. Automation scripts/processes and pipelines may be associated with a root cause node (e.g., end nodes without parents such as node 522), and when that node is identified to be the root cause of a given event (e.g., event "k"), the corresponding process associated with that root cause node may be triggered.

FIG. 6 depicts a sequence diagram of an illustrative method 600 of root cause identification. Although multiple computing devices and modules may perform the various steps of the method 600, the following details a predictor module 606, a conditional probability (CP) calculator 608, and a data store 610 performing the steps of the method. These modules may be parts of any type of computing device(s) (e.g., computing devices 103, 105, 107, 109 in FIG. 1; computing device 201 in FIG. 2; and/or computing devices 301, 302, 310 in FIG. 3). The predictor module 606 and the conditional probability (also referred to as CP) calculator 608 may be a part of a computing device configured to perform the steps of the method 400 and/or to traverse the causality network 500.

The method 600 may begin at step 612 where an endpoint device or a client (e.g., executing an incident reporter bot) may report an event (also referred to as an incident) to a priority queue 604. The event may have occurred within a computing environment. Within the priority queue 604, the reported event may be prioritized based on its severity at step 614. At step 616, the predictor module 606 may fetch (or request) the event from the priority queue. At step 618, the predictor module 606 may receive the event from the priority queue 604. At step 620, the predictor module may request a current version of a causality network from the data store 610. The data store 610 may return the requested causality network in step 624. At step 626, the predictor module may identify a node for the event (e.g., by executing step 404 of method 400).

In response to identifying the node at step 626, the predictor module 606 may execute a loop 628 as long as step 630 (parentExists==True) is satisfied (or, until a root cause node without any parents has been identified). In the loop 628, the prediction module may request CPs of the parent nodes (for the current node) from the CP calculator 608 at step 632. At step 634, the CP calculator 608 may calculate the CPs and at step 636 return the CPs of the parent nodes. At step 638, the predictor module 606 may traverse to the parent node having the maximum CP and execute the next cycle of the loop 628. At step 640 the predictor module may feedback the predicted value (e.g., root cause node) to the data store, e.g., for further training of the causality network. For instance, a domain expert may use the predicted value to verify that the causality network correctly identified the root cause. At step 642, the predictor module 606 may return the root cause and the causation path back to the incident reporter 602.

Figure 7:
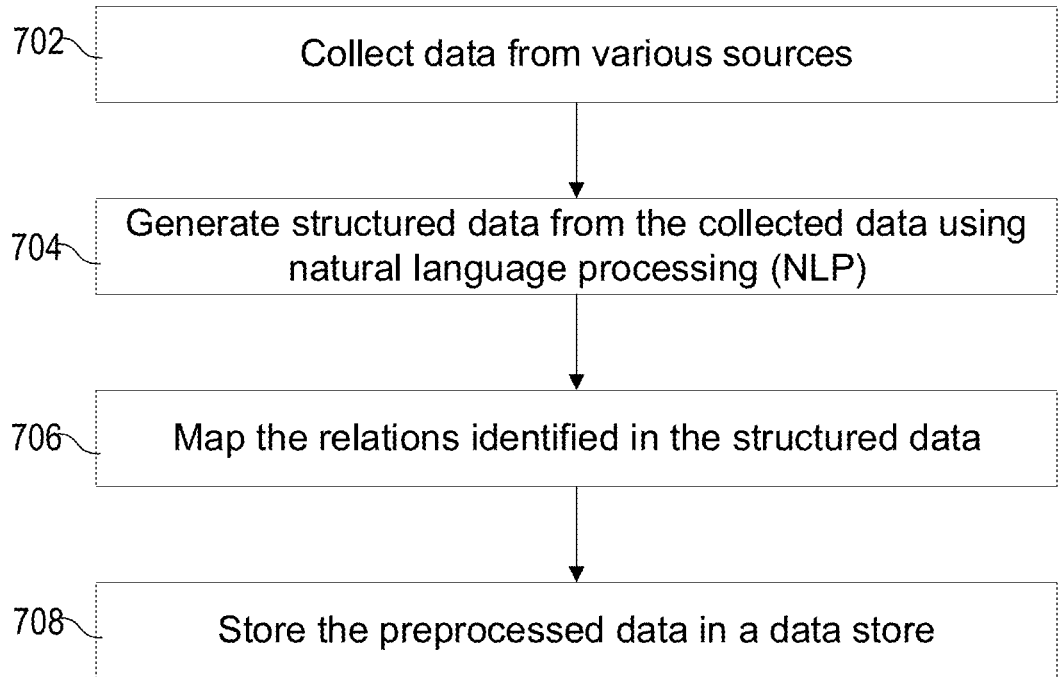
FIG. 7 depicts a flow chart of an illustrative method of preprocessing of data from a computing environment.

FIG. 7 depicts a flow chart of an illustrative method 700 of preprocessing of data from a computing environment (e.g., a cloud service). The data may originate from technical issues (and fixes thereof) within the computing environment (e.g., tickets with technical issues to be resolved). Although the steps of the method may be performed by any kind of computing device(s) (e.g., computing devices 103, 105, 107, 109 in FIG. 1; computing device 201 in FIG. 2; and/or computing devices 301, 302, 310 in FIG. 4), the following details, for brevity, a computing device performing all the steps of the method. It should also be understood that the steps shown in FIG. 7 are merely illustrative and additional, alternative, and fewer number of steps should also be considered to be within the scope of this disclosure.

The method 700 may begin at step 702 where the computing device may collect data from various sources. Some illustrative sources of data include Confluence troubleshooting pages, Jira tickets, and Slack alert messages and threads. For example, the computing device may use the set of application programming interfaces (APIs) provided by Jira to scrape data from specific sections of a Jira ticket, such as description, comments, title, justification, and description of resolution of the technical issue identified in the ticket. The computing device may also scrape recorded incidents and the corresponding causes from Confluence pages. The computing device may also scrape incident and corresponding cause data from Slack threads. However, the data collected from the aforementioned and other sources may not necessarily be structured and the computing device may perform the subsequent steps to structure and map the relations in the collected data. It should also be understood that these specific sources of data are merely for illustrations, and the computing device may collect/scrape data from various other sources not explicitly described here.

At the next step 704, the computing device may generate structured data from the collected data using natural language processing (NLP) algorithms such as using a multi-class text classifier. For example, the computing device may use set of class labels, e.g., provided by a domain expert, where the set of class labels may encompass known events. The computing device may execute the classifier using the set of class labels (corresponding to the known events) on the collected data as the input. The classifier may classify the input (e.g., the collected data such as tickets) into one or more of the specified classes (corresponding to events), and generate corresponding confidence rates. A confidence rate may indicate a relative accuracy of classification. For example, a classification with a lower confidence rate may be less accurate compared to a classification with a higher confidence rate. Another example of NLP includes the computing device identifying a sequence of events using spatial locality of words and order in which the words occur in the text of the collected data. For instance, a slack thread may show identification of a technical issue within the computing environment, identification of events that may have occurred within the computing environment in association with the technical issue, and the steps taken to resolve the technical issue.

In step 704, the computing device may map the relations identified in the structured data. More particularly, the computing device may generate two illustrative datasets mapping the relations in the structured data: (i) an incident occurrence table to store the events in association with the collected instances of data, and (ii) an adjacency matrix to depict causal relations between the events.

Figure 8:
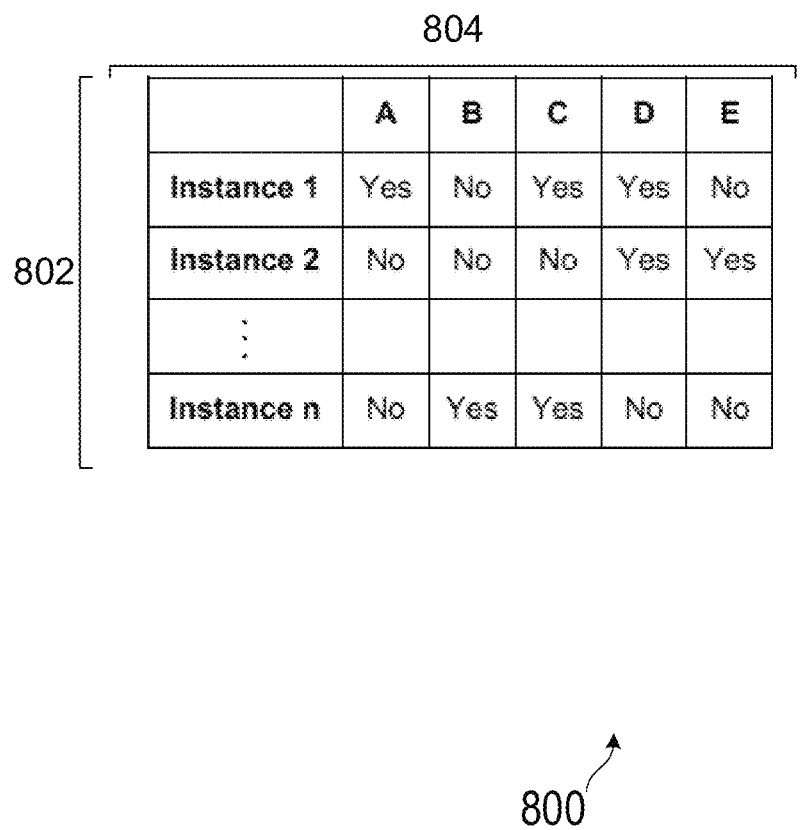
FIG. 8 depicts an illustrative occurrence table.

FIG. 8 depicts an illustrative occurrence table 800 for five events A, B, C, D, and E. For example, event A may be "Bad Gateway exception thrown" and event B be "Unable to connect to Livy server." Within the different instances (e.g., individual Jira tickets, individual Slack threads) of the collected data, the computing device may identify multiple events and generate the occurrence table 800 showing the occurrence of the identified events in the different instances. As described above, the different instances may occur in an computing environment and be associated with corresponding technical issues and/or resolutions thereof in the computing environment. As an example, in the occurrence table 800, the rows 802 denote the instances and the columns 804 denote the events that may have been identified in the corresponding instances. As shown, instance 1 (e.g., a first ticket), may include events A, C, and D but may not include events B and E. Instance 2 (e.g., a second ticket) may include events D and E but not include events A, B, and C. The occurrence table may therefore map the relations of events with the instances of collected data, e.g., showing what events may have occurred within a ticket.

Figure 9:
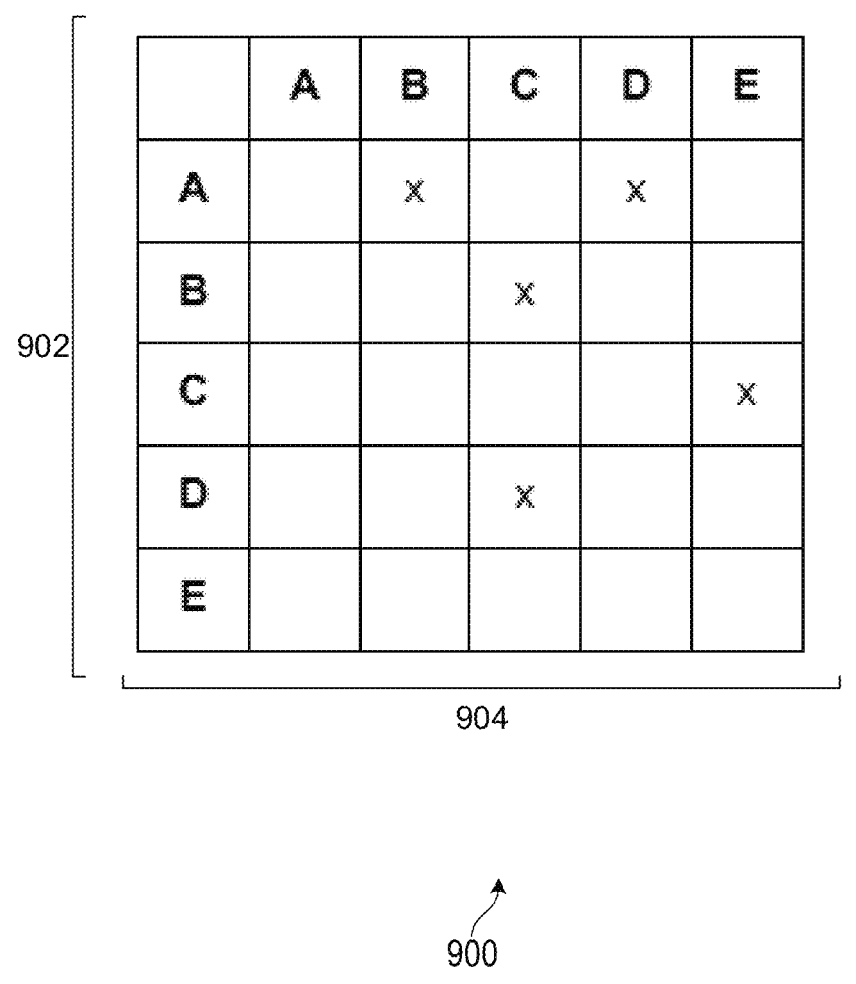

The computing device may further generate an adjacency matrix to map the causal relations between events shown in the data occurrence table 800. FIG. 9 depicts an illustrative adjacency matrix 900 mapping the causal relations between events A, B, C, D, and E. The rows 902 may denote the source events (e.g., events that may cause another event), the columns 904 denote the destination events (e.g., events that may be caused by other event), and the "x" denotes that a directed edge (e.g., to show a casual relation) is present from the corresponding source event to a corresponding destination event (e.g., the source event may have caused the destination event). Therefore, the directed edges shown by the adjacency matrix 900 may be {A→B (indicating event A may have caused event B), A→D (indicating event A may have caused event D), B→C (indicating event B may have caused event C), C→E (indicating that event C may have caused event E), D→C (indicating that event D may have caused event C)}. The adjacency matrix 900 may therefore indicate the chain of causations among the events A, B, C, D, and E.

At a next step 708, the computing device may store the data (e.g., the occurrence table, the adjacency matrix, and/or the raw data) in a data store. A computing device may use the stored data to train or otherwise generate a causality network.

Figure 10:
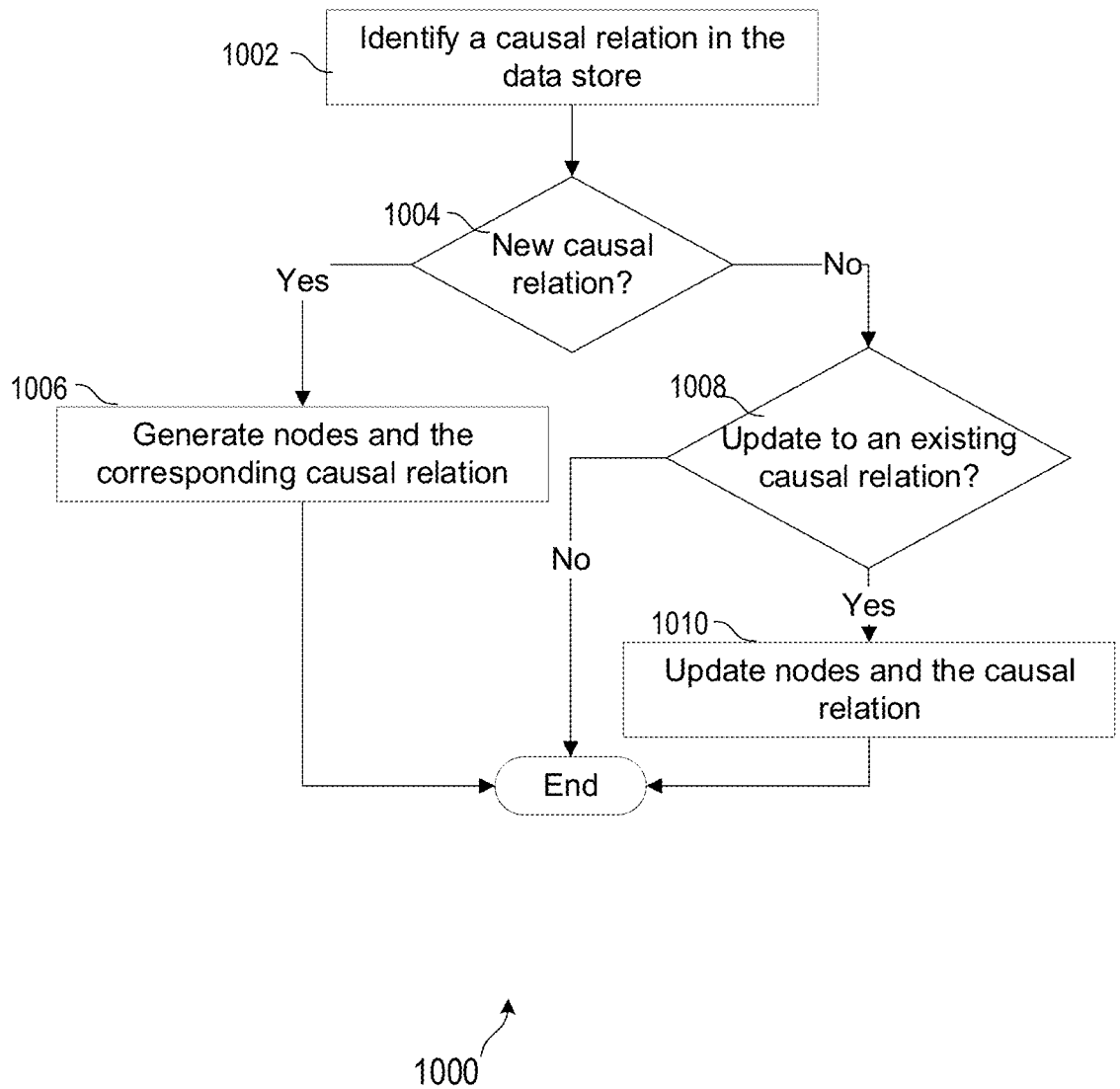
FIG. 10 depicts a flow chart of an illustrative method to generate a causality network.

FIG. 10 depicts a flow chart of an illustrative method 1000 to generate a causality network for root cause identification (e.g., by using the causal relations identified and mapped during the preprocessing stage). Although multiple computing devices (e.g., computing devices 103, 105, 107, 109 in FIG. 1; computing device 201 in FIG. 2; and/or computing devices 301, 302, 310 in FIG. 3) may perform one or more steps of the method 1000, the following describes, for brevity, a computing device performing all the steps of the method. It should also be understood that the steps shown in FIG. 10 and described herein are merely illustrative, and embodiments with additional, alternative, or fewer number of steps should also be considered within the scope of this disclosure.

The method 1000 may begin at step 1002, where the computing device may identify a causal relation from a data store (e.g., the data store containing the preprocessed data generated by the computing device in method 700). The causal relation may be between two events where the first event may cause the second event. The causal relation may be indicated by a matrix (e.g., adjacency matrix 900 shown in FIG. 9) in the data store. To identify the causal relation, the computing device may analyze the adjacency matrix, which include the causal relations between the various events.

At step 1004, the computing device may determine whether the identified causal relation is a new causal relation. The new causal relation may be a relation in the adjacency matrix that may not yet exist in the current causal network. If the computing device determines that an identified causal relation is a new causal relation, the computing device may execute step 1006 to generate nodes and corresponding causal relation in the causal network. For instance, the computing device may determine that there exists a causal relation between events A and B, with the directionality being A (cause event) B (effect event). The computing device may generate first node for event A, a second node for event B and a directed edge from A to B in the causal network.

However, if the computing device in step 1004 determines that the identified causal relation is not a new causal relation, the computing device may execute step 1008 to determine whether the identified causal relation is an update to an existing causal relation. To make this determination, the computing device may identify if there is at least one event of the causal relation already in the causality network. For instance, the causal relation may be between event A and event B, and the causality network may already have the causal relation. The computing device may then determine that the identified causal relation in the data store is an update to an already existing causal relation in the causality network. If the identified causal relation is an update to an existing causal relation, the computing device may execute step 1010 to update existing data of the causality network (e.g., data that represents nodes and causal relations of the causality network). For example, the computing device may recalculate the CPTs for at least one of the node in the causal relation. In other words, the computing device may update the strength of the causal relation.

Execution of the method 1000 may therefore allow the computing device to generate and/or update a causality network based on identified causal relations from the data in the data store. The nodes in the causality network may also include corresponding conditional probability tables (CPTs), which may be populated and/or updated to indicate the strength of the relations between the nodes.

Figure 11:
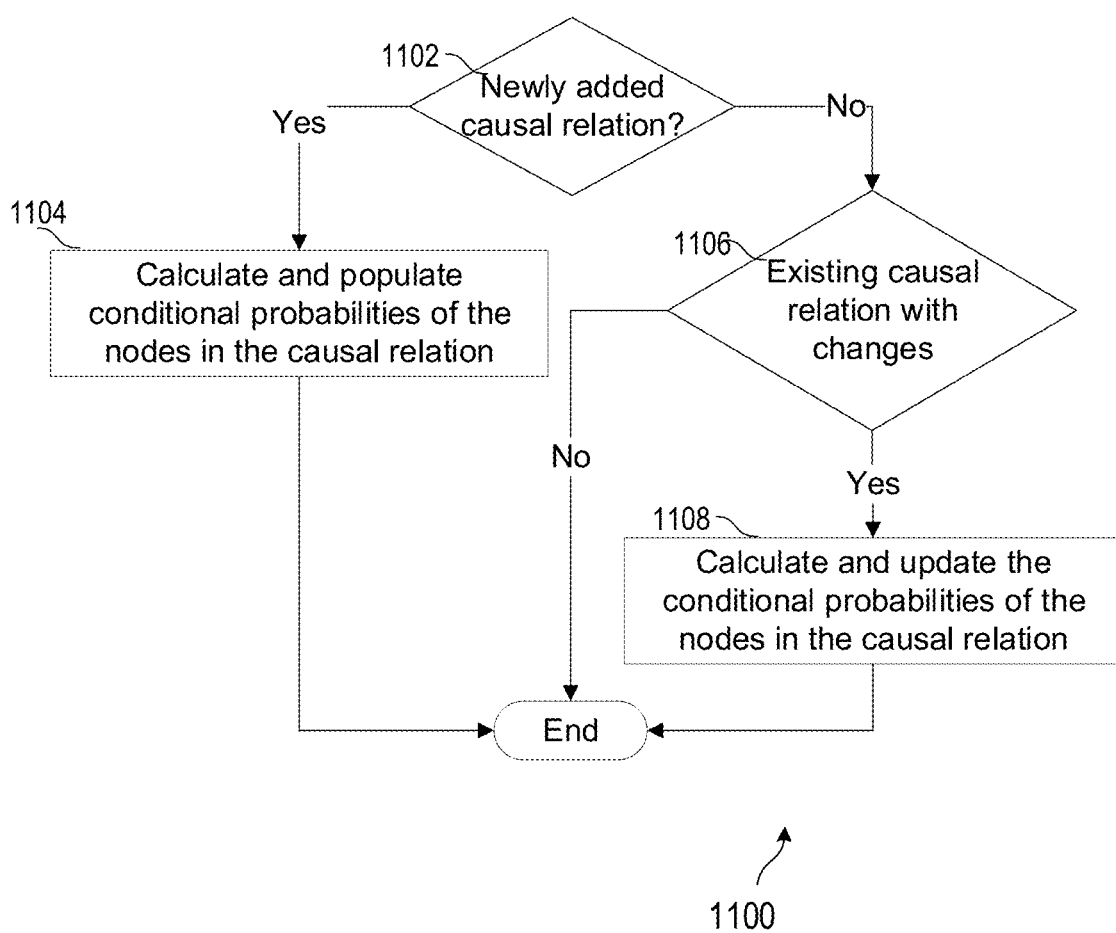
FIG. 11 depicts a flow chart of an illustrative method to generate the Conditional Probability tables of the nodes in the causality network.

FIG. 11 depicts a flow chart of an illustrative method 1100 to generate a causality network, particularly to populate and/or update CPTs for the nodes in the causality network. Although multiple types of computing devices (e.g., computing devices 103, 105, 107, 109 in FIG. 1; computing device 201 in FIG. 2; and/or computing devices 301, 302, 310 in FIG. 3) may perform one or more steps of the method 1100, the following describes, for brevity, a training computing device performing all the steps of the method. It should also be understood that the steps shown in FIG. 11 and described herein are merely illustrative, and embodiments with additional, alternative, or fewer number of steps should also be considered within the scope of this disclosure.

The method 1100 may begin at step 1102 where the computing device may determine if an identified causal relation is a newly added causal relation in the causality network. For example, the computing device may have flagged newly added causal relation during the execution of the method 1000. In another example, the computing device may perform a comparison of a version of the causality network after the execution of the method 1000 to a version of the causality network before the execution of the method 1000. If the computing device determines that there is a newly added causal relation, the computing device may execute step 1104 to calculate and populate CPTs of the nodes in the causal relation using the following approach.

A node in the causality network may have a CPT that may comprise conditional probability (CP) values of that node given the state of its parent nodes. As an example, the computing device may use Bayes' theorem to calculate the CP values. According to Bayes' theorem, if A and B are two random events in the causality network, conditional probability of A given B [P(A|B)] may be expressed as:

$$P(A \mid B) = \frac{P(B \mid A)P(A)}{P(B)},$$

where P(A) and P(B) may be prior probabilities of event A and event B respectively, and where P(B|A) may be a conditional probability of occurrence event B given an occurrence of event A.

In the Bayesian causality network (also referred to as Bayesian belief network), the number of CPT values may be determined by the number of parent nodes and the number of states of the parent nodes. A state for a node may be one of the conditions of the events represented by the node. For example, in the causality network described herein, the nodes may have two states: TRUE (indicating an occurrence of the represented event) and FALSE (indicating a non-occurrence of the represented event). In such two state scenario, the CPT for a node may have $2^{n+1}$ values, where n is the number of parent nodes. For example, the node "unable to connect to Timeline server (b)" in FIG. 5A has one parent node ("Required servers (History, Timeline, Livy) are not running in headnodehost(a)") and one child node ("Failed to submit Spark jobs(d)"). The number of CPT values that the CPT calculator may have to calculate for this "unable to connect to Timeline server (b)" with one parent is given by: $2^{n+1}=2^{1+1}=2^2=4$ values.

FIG. 12 depicts an illustrative CPT 1200 for a node b (e.g., "unable to connect to Timeline server (b)" in FIG. 5A) with one parent node (e.g., "Required servers (History, Timeline, Livy) are not running in headnodehost(a)" in FIG. 5A). The computing device may populate the CPT as follows: X1=probability of b being TRUE when a is TRUE; X2=probability of b being TRUE when a is FALSE; X3=probability of b being FALSE when a is TRUE; and X4=probability of b being FALSE when a is FALSE. X1, X2, X3, and X4 may be numerical values calculated based on the entries in the adjacency matrix and/or in the occurrence table.

If the computing device determines in step 1102 that the identified causal relation is not a newly added causal relation, the computing device may execute step 1106 to determine if the identified causal relation is an existing causal relation with changes. For example, the computing device may have set a flag during the execution of the method 1000 that the causal relation was an update to an existing causal relation and not a new causal relation. If the computing device determines in step 1106 that the identified causal relation is an existing causal relation with changes, the computing device may execute step 1108 to calculate and update the CPs of the nodes in the existing causal relation using the approach described above. After the execution of the method 1100, the causality network may be used for causality analysis, e.g., for execution of methods 400 and 600.

Figure 13:
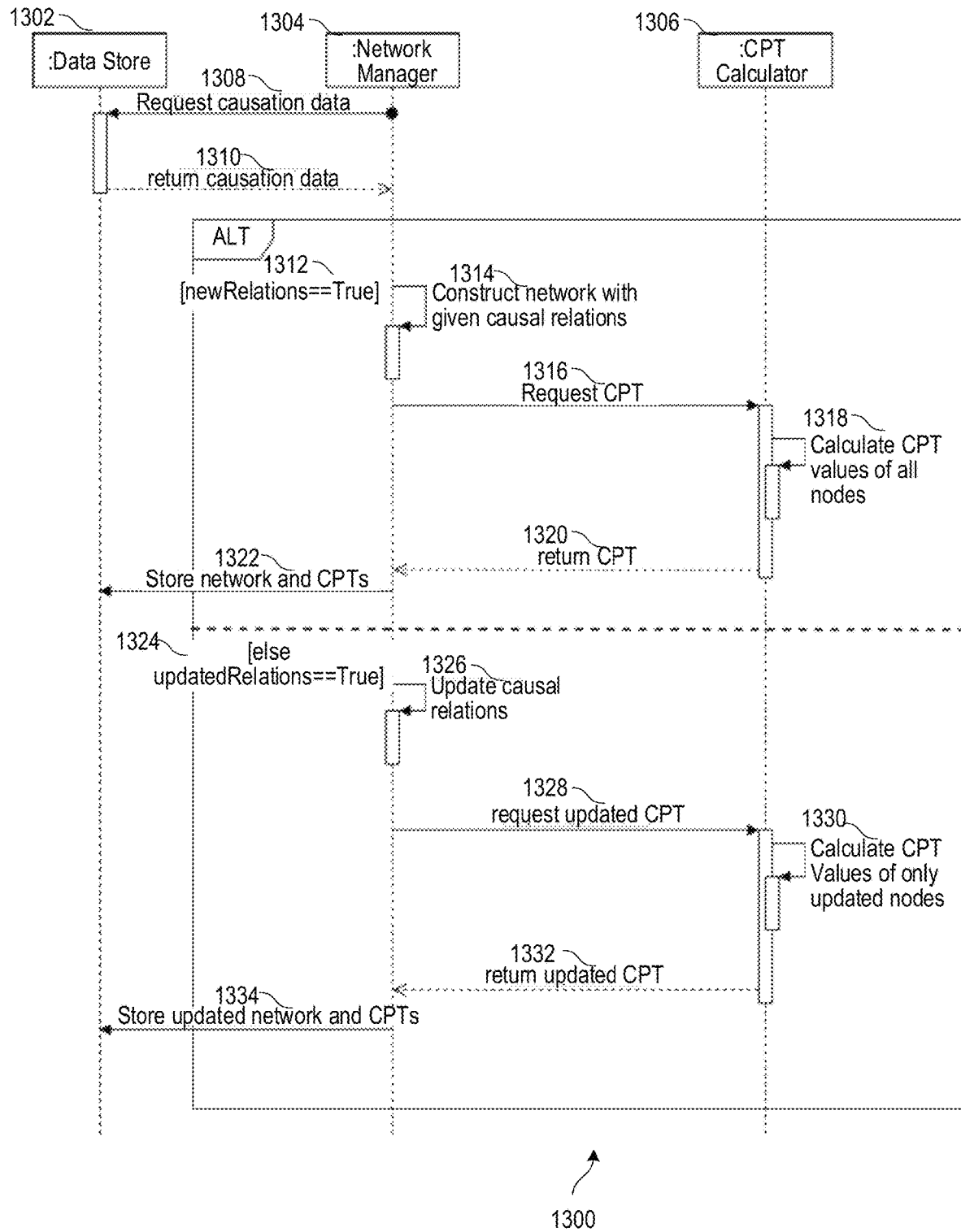
FIG. 13 depicts a sequence diagram of an illustrative method to generate a causality network.

FIG. 13 depicts a sequence diagram of an illustrative method 1300 to generate a causality network. The sequence diagram shows three components, a data store 1302, a network manager 1304, and a CPT calculator 1306 performing the steps of the method for clarity of explanation and should not be construed as limiting. The data sore 1302, the network manager 1304, and the CPT calculator 1306 may be parts of a computing device (e.g., computing devices 103, 105, 107, 109 in FIG. 1; computing device 201 in FIG. 2; and/or computing devices 301, 302, 310 in FIG. 3). It should further be understood that the steps described herein are merely illustrative and additional, alternative, and fewer number of steps should be considered within the scope of this disclosure.

The method 1300 may begin at step 1308 where the network manager 1304 may request causation data from the data store 1302. The causation data may include for example, an adjacency matrix and/or an occurrence table stored in the data store 1302. At step 1310, the data store 1302 may return the requested causation data to the network manager 1304. At step 1312, the network manager 1304 may determine whether there are new causal relations in the causation data. For instance, the network manager 1304 may determine that one or more events in the adjacency matrix and/or the occurrence table are not present in the existing causality network. If the network manager 1304 determines that there are new causal relations, the network manager 1304 may execute steps 1314-1322. However, if the network manager determines in step 1312 that there are no new causal relations in the causation data, the network manager may execute steps 1324-1334.

At step 1314 (executed when there are new causal relations), the network manager 1304 may construct a causality network with new causal relations in the causation data. For example, the network manager 1304 may generate nodes and directed edges to connect the nodes based on the causal relations by executing method 1000. At step 1316, the network manager 1304 may request CPTs from the CPT calculator 1306 for the nodes. At step 1318, the CPT calculator may calculate CPTs for the nodes by, e.g., executing the method 1100. At step 1320, the CPT calculator may return CPTs (e.g., CPT 1200) for the nodes to the network manager 1304. At step 1322, the network manager 1304 may store the causality network and the corresponding CPTs in the data store 1302.

At step 1324 (executed when there are no new causal relations), the network manager 1304 may determine whether there are updated causal relations (e.g., updates to existing causal relations in the current version of the causality network). If the network manager 1304 determines that there are updated causal relations, the network manager 1304 may execute step 1326 to update the existing causal relations. At step 1328, the network manager 1304 may request updated CPT values from the CPT calculator 1306. At step 1330, the CPT calculator 1306 may calculate CPT values of the updated nodes (e.g., corresponding to the updated causal relations). The CPT calculator 1306 may return the updated CPTs to the network manager 1304 at step 1332. At step 1334 the network manager 1304 may store the updated causality network and the updated CPTs in the data store 1302. The causality network may be used for causality analysis, e.g., to execute methods 400 and 600.

Embodiments disclosed herein may be used in any type of computing architecture and is not limited to the architecture disclosed herein. For instance, these embodiments may be used by any type of computer or network monitoring tool that tracks a sequences of related (e.g., having causal relations) events. Furthermore, embodiments disclosed herein may also be used for product design (e.g., for software development). A causality network may be generated for different changes to a design, and the causality network may be used to backtrack to a change of the design that may have caused a current issue. Therefore, using the causality network designers may detect underlying problems during early stages of the design.

The example processes described herein may be implemented using multithreading and parallel processing. These optimizations may decrease latency overhead and increase efficiency. For memory optimization, permanently resolved nodes may be removed from the causal network. For instance, if it has been resolved that event A has become obsolete and has been declared that it won't be encountered in the future by the domain experts, the node represented by the event A and the causal relations associated with that node may be removed from the causal network. The example processes may be optimized towards updating causal relations as opposed to generating new causal relations for further memory optimization. To optimize CPU loads, the example processes may use load balancing and traffic managing.

The preprocessing of the data may be further optimized by using domain knowledge (e.g., knowledge of domain experts). Furthermore, the classes generated with natural language processing (NLP) may be updated, e.g., using domain knowledge, when the confidence rate of one or more existing classes fall below a threshold. It should be understood that these are but a few optimizations to the embodiments described herein. Other optimizations and/or alternate uses should also be considered within the scope of this disclosure.

The following paragraphs (M1) through (M20) describe examples of methods that may be implemented in accordance with the present disclosure.

(M1) A method comprising receiving, by a computing device, data indicative of an event of a computing environment; identifying a data point within a collection of data, the data point being representative of the event; determining a root cause of the event by beginning an analysis of the collection of data from the identified data point and ending at a data point of the collection from which no other causal relations to other data points of the collection exist, the analysis including determination to proceed to a next data point of the collection based on a probability that a given data point represents another event causing the event and existence of a direct causal relation between a data point under analysis and the next data point; and generating output that identifies the root cause of the event based on the analysis of the collection of data.

(M2) A method may be performed as described in paragraph (M1) further comprising: receiving a plurality of data instances from the computing environment; identifying a plurality of events from the plurality of data instances using natural language processing; and associating a corresponding subset of the plurality of events with a corresponding data instance.

(M3) A method may be performed as described in paragraph (M1) through (M2), wherein the plurality of data instances comprises at least one of a ticket, an alert message, a message thread, and a troubleshooting page.

(M4) A method may be performed as described in any of paragraphs (M1) through (M3), further comprising: associating at least a first event of the plurality of events with a second event of the plurality of events to indicate a causal relation between the first event and the second event.

(M5) A method may be performed as described in any of paragraphs (M1) through (M4), wherein the causal relation indicates that the first event causes the second event.

(M6) A method may be performed as described in any of paragraphs (M1) through (M5), further comprising: in response to determining that the causal relation is a new relation: generating at least one of a first data point for the first event and a second data point for the second event; generating an edge from the first data point to the second data point; and appending the edge and at least one of the first data point and the second data point to the collection of data.

(M7) A method may be performed as described in any of paragraphs (M1) through (M6), further comprising: calculating conditional probability tables for at least one of the first data point and the second data point.

(M8) A method may be performed as described in any of paragraphs (M1) through (M7), further comprising: in response to determining that the causal relation is an update to an existing relation in the collection of data: updating at least one of: a first data point for the first event; a second data point for the second event; and an edge from the first data point to the second data point.

(M9) A method may be performed as described in any of paragraphs (M1) through (M8), further comprising: updating conditional probability tables for at least one of the first data point and the second data point.

(M10) A method may be performed as described in any of paragraphs (M1) through (M9), wherein the collection of data comprises a Bayesian belief network.

(M11) A method comprising: receiving, by a computing device, data indicative of an event of a computing environment; identifying a data point within a collection of data, the data point being representative of the received event; determining a root cause of the event by traversing the collection of data from the identified data point and based on conditional probabilities of child data point and parent data point pairs in the path of traversal, until a data point with no parent is reached; and outputting an event represented by the data point with no parent as the root cause of the event.

(M12) A method may be performed as described in paragraph (M11) further comprising: outputting the path of traversal from the identified data point to the data point with no parent.

(M13) A method may be performed as described in any of paragraphs (M11) through (M12), wherein the data points in the collection of data comprise two states.

(M14) A method may be performed as described in any of paragraphs (M11) through (M13), wherein the conditional probabilities of the child data point and parent data point pairs indicate a likelihood of an event represented by the parent data point given an event represented by the child data point.

(M15) A method may be performed as described in any of paragraphs (M11) through (M14), wherein the collection of data comprises a Bayesian belief network.

(M16) A method comprising receiving a plurality of data instances from a computing environment; identifying a plurality of events from the data instances; associating a first event of the plurality of events with a second event of the plurality of events to indicate a causal relation between the first event and the second event; in response to determining that the causal relation is a new relation: generating at least one of a first data point representing the first event and a second data point representing the second event; generating an edge from the first data point to the second data point; appending the edge and at least one of the first data point and the second data point to a collection of data; and calculating conditional probability tables for at least one of the first data point and the second data point.

(M17) A method may be performed as described in paragraph (M16), further comprising: deploying the collection of data to identify a root cause of an event received from the computing environment.

(M18) A method may be performed as described in any of paragraphs (M16) through (M17), further comprising: in response to determining that the causal relation is an update to an existing relation in the collection of data: updating at least one of: a first data point representing the first event; a second data point representing the second event; an edge from the first data point to the second data point; conditional probability tables for the first data point; and conditional probability tables for the second data point.

(M19) A method may be performed as described in any of paragraphs (M16) through (M18), wherein the plurality of events from the plurality data instances are identified using natural language processing.

(M20) A method may be performed as described in any of paragraphs (M16) through (M19), wherein the plurality of data instances comprises at least one of a ticket, an alert message, a message thread, and a troubleshooting page.

The following paragraphs (A1) through (A20) describe examples of apparatuses that may be implemented in accordance with the present disclosure.

(A1) An apparatus comprising one or more processors; and memory instructions that, when executed by the one or more processors, cause the apparatus to receive data indicative of an event of a computing environment; identify a data point within a collection of data, the data point being representative of the event; determine a root cause of the event by beginning an analysis of the collection of data from the identified data point and ending at a data point of the collection from which no other causal relations to other data points of the collection exist, the analysis including determination to proceed to a next data point of the collection based on a probability that a given data point represents another event causing the event and existence of a direct causal relation between a data point under analysis and the next data point; and generate output that identifies the root cause of the event based on the analysis of the collection of data.

(A2) An apparatus as described in paragraph (A1) wherein the instructions, when executed by the one or more processors, cause the apparatus to receive a plurality of data instances from the computing environment; identify a plurality of events from the plurality of data instances using natural language processing; and associating a corresponding subset of the plurality of events with a corresponding data instance.

(A3) An apparatus as described in any of the paragraphs (A1) through (A2), wherein the plurality of data instances comprises at least one of a ticket, an alert message, a message thread, and a troubleshooting page.

(A4) An apparatus as described in any of paragraphs (A1) through (A3), wherein the instructions, when executed by the one or more processors, cause the apparatus to associate at least a first event of the plurality of events with a second event of the plurality of events to indicate a causal relation between the first event and the second event.

(A5) An apparatus as described in any of paragraphs (A1) through (A4), wherein the causal relation indicates that the first event causes the second event.

(A6) An apparatus as described in any of paragraphs (A1) through (A5), wherein the instructions, when executed by the one or more processors, cause the apparatus to in response to determining that the causal relation is a new relation: generate at least one of a first data point for the first event and a second data point for the second event; generate an edge from the first data point to the second data point; and append the edge and at least one of the first data point and the second data point to the collection of data.

(A7) An apparatus as described in any of paragraphs (A1) through (A6), wherein the instructions, when executed by the one or more processors, cause the apparatus to calculate conditional probability tables for at least one of the first data point and the second data point.

(A8) An apparatus as described in any of paragraphs (A1) through (A7), wherein the instructions, when executed by the one or more processors, cause the apparatus to in response to determining that the causal relation is an update to an existing relation in the collection of data: update at least one of: a first data point for the first event; a second data point for the second event; and an edge from the first data point to the second data point.

(A9) An apparatus as described in any of paragraphs (A1) through (A8), wherein the instructions, when executed by the one or more processors, cause the apparatus to update conditional probability tables for at least one of the first data point and the second data point.

(A10) An apparatus as described in any of paragraphs (A1) through (A9), wherein the collection of data comprises a Bayesian belief network.

(A11) An apparatus comprising one or more processors; and memory instructions that, when executed by the one or more processors, cause the apparatus to receive data indicative of an event of a computing environment; identify a data point within a collection of data, the data point being representative of the received event; determine a root cause of the event by traversing the collection of data from the identified data point and based on conditional probabilities of child data point and parent data point pairs in the path of traversal, until a data point with no parent is reached; and output an event represented by the data point with no parent as the root cause of the event.

(A12) An apparatus as described in paragraph (A11), wherein the instructions, when executed by the one or more processors, cause the apparatus to output the path of traversal from the identified data point to the data point with no parent.

(A13) An apparatus as described in any of the paragraphs (A11) through (A12), wherein the data points in the collection of data comprise two states.

(A14) An apparatus as described in any of the paragraphs (A11) through (A13), wherein the conditional probabilities of the child data point and parent data point pairs indicate a likelihood of an event represented by the parent data point given an event represented by the child data point.

(A15) An apparatus as described in any of the paragraphs (A11) through (A14), wherein the collection of data comprises a Bayesian belief network.

(A16) An apparatus comprising one or more processors; and memory instructions that, when executed by the one or more processors, cause the apparatus to receive a plurality of data instances from a computing environment; identify a plurality of events from the data instances; associate a first event of the plurality of events with a second event of the plurality of events to indicate a causal relation between the first event and the second event; in response to determining that the causal relation is a new relation: generate at least one of a first data point representing the first event and a second data point representing the second event; generate an edge from the first data point to the second data point; and append the edge and at least one of the first data point and the second data point to a collection of data; and calculate conditional probability tables for at least one of the first data point and the second data point.

(A17) An apparatus as described in paragraph (A16), wherein the instructions, when executed by the one or more processors, cause the apparatus to deploy the collection of data to identify a root cause of an event received from the computing environment.

(A18) An apparatus as described in any of paragraphs (A16) through (A17), wherein the instructions, when executed by the one or more processors, cause the apparatus to in response to determining that the causal relation is an update to an existing relation in the collection of data: update at least one of: a first data point representing the first event; a second data point representing the second event; an edge from the first data point to the second data point; conditional probability tables for the first data point; and conditional probability tables for the second data point.

(A19) An apparatus as described in any of paragraphs (A16) through (A18), wherein the plurality of events from the plurality data instances are identified using natural language processing.

(A20) An apparatus as described in any of paragraphs (A16) through (A19), wherein the plurality of data instances comprises at least one of a ticket, an alert message, a message thread, and a troubleshooting page.

The following paragraphs (CRM1) through (CRM20) describe examples of computer-readable media that may be implemented in accordance with the present disclosure.

(CRM1) A non-transitory computer-readable medium storing instructions that, when executed, cause a system to receive data indicative of an event of a computing environment; identify a data point within a collection of data, the data point being representative of the event; determine a root cause of the event by beginning an analysis of the collection of data from the identified data point and ending at a data point of the collection from which no other causal relations to other data points of the collection exist, the analysis including determination to proceed to a next data point of the collection based on a probability that a given data point represents another event causing the event and existence of a direct causal relation between a data point under analysis and the next data point; and generate output that identifies the root cause of the event based on the analysis of the collection of data.

(CRM2) A non-transitory computer-readable medium as described in paragraph (CRM1) wherein the instructions, when executed, cause the system to receive a plurality of data instances from the computing environment; identify a plurality of events from the plurality of data instances using natural language processing; and associating a corresponding subset of the plurality of events with a corresponding data instance.

(CRM3) A non-transitory computer-readable medium as described in any of the paragraphs (CRM1) through (CRM2), wherein the plurality of data instances comprises at least one of a ticket, an alert message, a message thread, and a troubleshooting page.

(CRM4) A non-transitory computer-readable medium as described in any of paragraphs (CRM1) through (CRM3), wherein the instructions, when executed, cause the system to associate at least a first event of the plurality of events with a second event of the plurality of events to indicate a causal relation between the first event and the second event.

(CRM5) A non-transitory computer-readable medium as described in any of paragraphs (CRM1) through (CRM4), wherein the causal relation indicates that the first event causes the second event.

(CRM6) A non-transitory computer-readable medium as described in any of paragraphs (CRM1) through (CRM5), wherein the instructions, when executed, cause the system to in response to determining that the causal relation is a new relation: generate at least one of a first data point for the first event and a second data point for the second event; generate an edge from the first data point to the second data point; and append the edge and at least one of the first data point and the second data point to the collection of data.

(CRM7) A non-transitory computer-readable medium as described in any of paragraphs (CRM1) through (CRM6), wherein the instructions, when executed, cause the system to calculate conditional probability tables for at least one of the first data point and the second data point.

(CRM8) A non-transitory computer-readable medium as described in any of paragraphs (CRM1) through (CRM7), wherein the instructions, when executed, cause the system to in response to determining that the causal relation is an update to an existing relation in the collection of data: update at least one of: a first data point for the first event; a second data point for the second event; and an edge from the first data point to the second data point.

(CRM9) A non-transitory computer-readable medium as described in any of paragraphs (CRM1) through (CRM8), wherein the instructions, when executed, cause the system to update conditional probability tables for at least one of the first data point and the second data point.

(CRM10) A non-transitory computer-readable medium as described in any of paragraphs (CRM1) through (CRM9), wherein the collection of data comprises a Bayesian belief network.

(CRM11) A non-transitory computer-readable medium storing instructions that, when executed, cause a system to receive data indicative of an event of a computing environment; identify a data point within a collection of data, the data point being representative of the received event; determine a root cause of the event by traversing the collection of data from the identified data point and based on conditional probabilities of child data point and parent data point pairs in the path of traversal, until a data point with no parent is reached; and output an event represented by the data point with no parent as the root cause of the event.

(CRM12) A non-transitory computer-readable medium as described in paragraph (CRM11), wherein the instructions, when executed, cause the system to output the path of traversal from the identified data point to the data point with no parent.

(CRM13) A non-transitory computer-readable medium as described in any of the paragraphs (CRM11) through (CRM12), wherein the data points in the collection of data comprise two states.

(CRM14) A non-transitory computer-readable medium as described in any of the paragraphs (CRM11) through (CRM13), wherein the conditional probabilities of the child data point and parent data point pairs indicate a likelihood of an event represented by the parent data point given an event represented by the child data point.

(CRM15) A non-transitory computer-readable medium as described in any of the paragraphs (CRM11) through (CRM14), wherein the collection of data comprises a Bayesian belief network.

(CRM16) A non-transitory computer-readable medium storing instructions that, when executed, cause a system to receive a plurality of data instances from a computing environment; identify a plurality of events from the data instances; associate a first event of the plurality of events with a second event of the plurality of events to indicate a causal relation between the first event and the second event; in response to determining that the causal relation is a new relation: generate at least one of a first data point representing the first event and a second data point representing the second event; generate an edge from the first data point to the second data point; and append the edge and at least one of the first data point and the second data point to a collection of data; and calculate conditional probability tables for at least one of the first data point and the second data point.

(CRM17) A non-transitory computer-readable medium as described in paragraph (CRM16), wherein the instructions, when executed, cause the system to deploy the collection of data to identify a root cause of an event received from the computing environment.

(CRM18) A non-transitory computer-readable medium as described in any of paragraphs (CRM16) through (CRM17), wherein the instructions, when executed, cause the system to in response to determining that the causal relation is an update to an existing relation in the collection of data: update at least one of: a first data point representing the first event; a second data point representing the second event; an edge from the first data point to the second data point; conditional probability tables for the first data point; and conditional probability tables for the second data point.

(CRM19) A non-transitory computer-readable medium as described in any of paragraphs (CRM16) through (CRM18), wherein the plurality of events from the plurality data instances are identified using natural language processing.

(CRM20) A non-transitory computer-readable medium as described in any of paragraphs (CRM16) through (CRM19), wherein the plurality of data instances comprises at least one of a ticket, an alert message, a message thread, and a troubleshooting page.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   receiving, by a computing device, data indicative of a first event of a computing environment;
   identifying, by using natural language processing, a first data point, within a collection of data points, by comparing text associated with the first data point with text associated with the first event, wherein the collection of data points indicate events occurring in the computing device;
   determining a root cause of the first event by beginning an analysis of the collection of data points from the first data point and ending at a last data point of the collection of data points, wherein no other causal relations exist between the last data point and other data points of the collection of data points, and wherein the analysis comprises a determination to proceed from the first data point to a second data point, of the collection of data points, based on a probability that the second data point represents a second event causing the first event and an existence of a direct causal relation between the first data point and the second data point;
   generating an output indicating the root cause; and
   using the root cause to mitigate problems associated with the first event or the root cause.

2. The method of claim 1, further comprising:
   prior to receiving the data:
   receiving a plurality of data instances from the computing environment;
   identifying, by using natural language processing, a plurality of events from the plurality of data instances, wherein the plurality of events comprises at least the first event and the second event; and
   associating a corresponding subset of the plurality of events with a corresponding data instance.

3. The method of claim 2, wherein the plurality of data instances comprises at least one of a ticket, an alert message, a message thread, or a troubleshooting page.

4. The method of claim 2, further comprising:
   storing at least one adjacency matrix indicating the direct causal relation between the first data point and the second data point.

5. The method of claim 4, wherein the direct causal relation indicates that the second event caused the first event.

6. The method of claim 5, further comprising:
   in response to determining that the direct causal relation is a new relation:
   generating an edge from the first data point to the second data point; and
   appending the edge, the first data point, and the second data point to the collection of data points.

7. The method of claim 6, further comprising:
calculating conditional probability tables for at least one of the first data point and the second data point.

8. The method of claim 5, further comprising:
in response to determining that the direct causal relation is an update to an existing relation in the collection of data points:
updating at least one of:
the first data point for the first event;
the second data point for the second event; and
an edge from the first data point to the second data point.

9. The method of claim 8, further comprising:
updating conditional probability tables for at least one of the first data point and the second data point.

10. The method of claim 1, wherein the collection of data points comprises a Bayesian belief network.

11. A method comprising:
receiving, by a computing device, data indicative of a first event of a computing environment;
identifying, by using natural language processing, a first data point, within a collection of data points, by comparing text associated with the first data point with text associated with the first event, wherein the collection of data points indicate events occurring in the computing device;
determining a root cause of the first event by traversing the collection of data points from the first data point until a second data point, with no parent data points, is reached, wherein the traversing is based on conditional probabilities of child data point and parent data point pairs in a path of the traversing;
outputting a second event, represented by the second data point, as the root cause of the first event; and
using the root cause to mitigate problems associated with the first event or the root cause.

12. The method of claim 11, further comprising:
outputting the path of traversing from the first data point to the second data point.

13. The method of claim 11, wherein data points in the collection of data points comprise states indicating whether events, corresponding to the data points, have occurred.

14. The method of claim 11, wherein the conditional probabilities of the child data point and parent data point pairs indicate a likelihood of a third event, represented by a parent data point, occurring given a fourth event, represented by a child data point, has occurred.

15. The method of claim 11, wherein the collection of data points comprises a Bayesian belief network.

16. A method comprising:
receiving, by a computing device, a plurality of data instances from a computing environment;
identifying, by using natural language processing, a plurality of events from the data instances;
associating a first event, of the plurality of events, with a second event, of the plurality of events, to indicate a causal relation between the first event and the second event;
in response to determining that the causal relation is a new relation:
generating a first data point representing the first event and a second data point representing the second event;
generating an edge from the first data point to the second data point;
appending the edge, the first data point, and the second data point to a collection of data; and
calculating conditional probability tables for at least one of the first data point and the second data point;
deploying the collection of data to identify a root cause of a first event; and
using the root cause to mitigate problems associated with the first event or the root cause.

17. The method of claim 16, further comprising:
deploying the collection of data to identify a second root cause of a third event received from the computing environment.

18. The method of claim 16, further comprising:
in response to determining that the causal relation is an update to an existing relation in the collection of data:
updating at least one of:
the first data point representing the first event;
the second data point representing the second event;
the edge from the first data point to the second data point;
the conditional probability tables for the first data point; or
the conditional probability tables for the second data point.

19. The method of claim 16, wherein the associating the first event with the second event comprises generating an adjacency matrix comprising the first event and the second event and indicating the causal relation.

20. The method of claim 16, wherein the plurality of data instances comprises at least one of a ticket, an alert message, a message thread, or a troubleshooting page.

* * * * *